United States Patent
Stuhec et al.

(10) Patent No.: US 7,836,392 B2
(45) Date of Patent: Nov. 16, 2010

(54) LAYOUT INFORMATION FOR DATA COMPONENT

(75) Inventors: Gunther Stuhec, Heidelberg (DE); Martin Möller, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 1130 days.

(21) Appl. No.: 11/063,000

(22) Filed: Feb. 22, 2005

(65) Prior Publication Data

US 2006/0101068 A1 May 11, 2006

Related U.S. Application Data

(60) Provisional application No. 60/627,013, filed on Nov. 10, 2004.

(51) Int. Cl.
*G06F 17/27* (2006.01)
*G06F 17/25* (2006.01)

(52) U.S. Cl. ............... 715/234; 715/235; 715/236; 715/237; 715/243; 715/248; 715/760

(58) Field of Classification Search .......... 715/234, 715/235, 237, 243, 236, 244–250, 760
See application file for complete search history.

(56) References Cited

U.S. PATENT DOCUMENTS

| | | | |
|---|---|---|---|
| 7,080,083 B2 * | 7/2006 | Kim et al. | 707/100 |
| 7,313,756 B2 * | 12/2007 | Panditharadhya et al. | 715/205 |
| 7,373,595 B2 * | 5/2008 | Jones et al. | 715/234 |
| 2002/0147748 A1 * | 10/2002 | Huang et al. | 707/517 |
| 2003/0149934 A1 | 8/2003 | Worden | 715/234 |
| 2004/0162871 A1 | 8/2004 | Pabla et al. | 709/201 |

FOREIGN PATENT DOCUMENTS

EP   1 424 643 A1   6/2004

OTHER PUBLICATIONS

[Brown (2003)] Brown, P.: Information Architecture with XML. A Management Strategy. John Wiley & Sons, Hoboken 2003.*
Kesseler, "A Schema Based Approach to HTML Authoring", published: Aug. 2000, pp. 1-17.*
Ali Mesbah, "Web-based XML Editing with W3C XML Schema and XSLT", published: Apr. 30, 2003, pp. Document A (pp. 1-6), Document B (pp. 1-6).*

(Continued)

*Primary Examiner*—Stephen S Hong
*Assistant Examiner*—Wilson Tsui
(74) *Attorney, Agent, or Firm*—Fish & Richardson P.C.

(57) ABSTRACT

In a computer system that is configured to contain schema definitions for several data components, layout information for at least one of the data components is stored in the schema definition for the at least one data component. A method of providing display of data in a graphical user interface includes accessing layout information for a data component, the layout information being included in a schema definition for the data component, and providing, using the accessed layout information, an instance of the data component for display in a graphical user interface. A browser can parse XSD artifacts of reusable building blocks and generate a graphical user interface with the embedded relative layout information of every building block.

20 Claims, 15 Drawing Sheets

OTHER PUBLICATIONS

"Adobe LiveCycle Designer FAQ" *Adobe Systems Incorporated*, document undated, 3 pages.

"Core Components Technical Specification V2.01—Part 8 of the ebXML Framework" for UN/CEFACT, Nov. 15, 2003, pp. 1-113.

XForms 1.1, W3C Working Draft Nov. 15, 2004, Obtained from the Internet at http://www.w3.org/TR/2004/WD-xforms11-20041115, on Dec. 6, 2004, 26 pages.

XML Schema, W3C, Obtained from the Internet http://www.w3.org/XML/Schema on Jan. 3, 2005, 16 pages.

XForms—The Next Generation of Web Forms, W3C, obtained from the Internet at http://www.w3.org/MarkUp/Forms, on Jan. 3, 2005, 11 pages.

XML Path Language (XPath) Version 1.0—W3C Recommendation Nov. 16, 1999, W3C, Obtained from the Internet at http://www.w3.org/TR/xpath, on Jan. 3, 2005, 37 pages.

InfoPath 2003 Product Overview, Microsoft Office Online, Obtained from the Internet at http://www.microsoft.com/office/infopath/prodinfo/overview.mspx, on Jan. 4, 2005.

Davis, J., *Context Tailor: Towards a Programming Model for Context-Aware Computing*, International Middleware Conference Workshop Proceedings—Middleware for Pervasive and Ad Hoc Computing, Jun. 16-20, 2003, Rio de Janeiro, Brazil, 68-75, 2003.

Oasis ebXML Registry TC[online], Oasis, 2005 [retrieved on Mar. 23, 2005]. Retrieved from the Internet: <URL: http://www.oasis-open.org/committees/tc_home.php?wg_abbrev=regrep>.

GoXML Registry [online], Xenos, 2002 [retrieved on Mar. 23, 2005]. Retrieved from the Internet: <URL: http://www.xmlglobal.com/solutions/prod_goxml_registry.asp>.

The Company of The Open Standard Solutions [online], ebXMLsoft Inc., 2001-2004 [retrieved on Mar. 23, 2005]. Retrieved from the Internet: <URL: http://www.ebsmlsoft.com/ >.

Project: ebXML Registry/Repository: Summary [online], SourceForge.net, 2005 [retrieved on Mar. 23, 2005]. Retrieved from the Internet: <URL: http://sourceforge.net/projects/ebsmlrr >.

AnHai Doan, Jayant Madhaven, Pedro Domingos, and Alon Halevy, "Learning to Map between Ontologies on the Semantic Web," May 2002, *Proceedings of the 11th International World Wide Web Conference*, pp. 662-673.

L. M. Haas, R. J. Miller, B. Niswonger, M. Tork Roth, P. M. Schwarz, and E. L. Wimmers, "Transforming Heterogeneous Data with Database Middleware: Beyond Integration," Copyright 1997, *Computer Society Technical Committee on Data Engineering*, pp. 1-6.

Hong-Hai Do and Erhard Rahm, "COMA—A system for flexible combination of schema matching approaches," Aug. 2002, *Proc. 28th Intl. Conference on Very Large Databases (VLDB)*, Hongkong, pp. 1-12.

Hong-Hai Do, Sergey Melnik, and Erhard Rahm, "Comparison of Schema Matching Evaluations," Oct. 2002, *Proc. GI-Workshop* "Web and Databases", Erfurt, pp. 1-15.

Jayant Madhavan, Philip A. Bernstein, and Erhard Rahm, "Generic Schema Matching with Cupid," 2001, *Proceedings of the 27$^{th}$ VLDB Conference*, pp. 49-58.

Jayant Madhaven, Philip A. Bernstein, and Erhard Rahm, "Generic Schema Matching with Cupid," Aug. 2001, *Microsoft Research*, MSR-TR-2001-58, pp. 1-15.

Sergey Melnik, Hector Garcia-Molina, and Erhard Rahm, "Similarity Flooding: A Versatile Graph Matching Algorithm and its Application to Schema Matching," 2002, *Proc 18$^{th}$ Int'l Conf. on Data Engineering (ICDE)*, pp. 1-12.

Lucian Popa, Yannis Velegrakis, Renee J. Miller, Mauricio A. Hernandez, Ronald Fagin, "Translating Web Data," 2002, *The Eleventh International WWW Conference*, pp. 1-12.

Hong Su, Harumi, Kuno, and Elke A. Rundensteiner, "Automating the Transformation of XML Documents," 2001, *The ACM Digital Library*, pp. 68-75.

http://www.flexisoftsolutions.com/Products/SM2004/SM2004.aspx—*FlexiSoft Solutions*, obtained from the Internet on Jun. 24, 2005, 4 pages.

http://ww.notes.queensu.ca/uisadmin.nsf/579a5e3cc0e046c085256833007715cc/$FILE/queries_quide.pdf—BI/Query Queries Guide, *Hummingbird, Ltd.*, obtained from the Internet on Jul. 18, 2005, 6 pages.

"Final Committee Draft ISO/IEC FCD—Information technology—Metadata registries (MDR)—Part 5: Naming and identification principles" *ISO/IEC*, document dated Jan. 8, 2004, 26 pages.

Goyal, "An XML Schema Naming Assister for Elements and Types," *National Institute of Standards and Technology*, document obtained at http://www.mel.nist.gov/msidlibrary/doc/NISTIR7143.pdf on Jun. 24, 2005, 12 pages.

"Information technology—Metadata registries (MDR)—Part 4: Formulation of data definitions," *ISO/IEC*, document dated Jul. 15, 2004, 16 pages.

"Information technology—Specification and standardization of data elements—Part 5: Naming and identification principles for data elements," *ISO/IEC*, document dated Dec. 1, 1995, 20 pages.

GEFEG EDIFIX, "EDIFIX Functions," [online], Xenos, 2002 [retrieved on Nov. 30, 2005]. <URL: http://www.gefeg.com/en/edifix/fx_functions.htm>.

"Information technology—Metadata Registries (MDR)—Part 1: Framework" International Standard ISO/IEC 11179-1; Sep. 15, 2004; (32 pages).

"Information technology—Metadata Registries (MDR)—Part 2: Classification"; International Standard ISO/IEC 11179-2; Nov. 15, 2005 (16 pages).

"Information Technology—Metadata Registries (MDR)—Part 3: Registry Metamodel and Basic Attributes"; International Standard ISO/IEC 11179-3; Feb. 15, 2003 (108 pages).

"Information Technology—Metadata Registries (MDR)—Part 5: Naming and Identification Principles"; International Standard ISO/IEC 11179-5; Sep. 1, 2005.

P. Garvey, B. French (2003), "Generating User Interfaces From Composite Schemas", Proceedings of XML 2003, Philadelphia, Pennsylvania, Dec. 2003.

P. Lay, S. Luttringhaus-Kappel (2004), "Transforming XML Schemas into Java Swing GuIs", GI Jahrestagung (1) Sep. 20-24, 2004.

Novell Xforms Strategy. White Paper, Feb. 26, 2003, http://www.nmpub.com/eForms/onfolio-files/Novell%20Xforms%20Strategy.pdf.

XForms 1.0-W3C Recommendation Oct. 14, 2003, edited by M. Dubinko et al., http://www.w3.org/TR/2003/REC-xforms-20031014/.

EP Office Action dated Apr. 2, 2009, Appln No. 05/787 252.5.

"Adobe LiveCycle Designer FAQ" *Adobe Systems Incorporated*, 3 pages, 2004.

Non-Final Office Action in U.S. Appl. No. 11/618,529 mailed Dec. 8, 2008, 9 pages.

Fish & Richardson, Response to Non-Final Office Action in U.S. Appl. No. 11/618,529 mailed Mar. 4, 2009, 12 pages.

Final Office Action in U.S. Appl. No. 11/618,529 mailed Jun. 3, 2009, 8 pages.

Fish & Richardson, Response to Final Office Action in U.S. Appl. No. 11/618,529 mailed Jul. 22, 2009, 10 pages.

Non-Final Office Action in U.S. Appl. No. 11/618,529 mailed Aug. 3, 2009, 9 pages.

Fish & Richardson, Response to Non-Final Office Action in U.S. Appl. No. 11/618,529 mailed Oct. 28, 2009, 9 pages.

\* cited by examiner

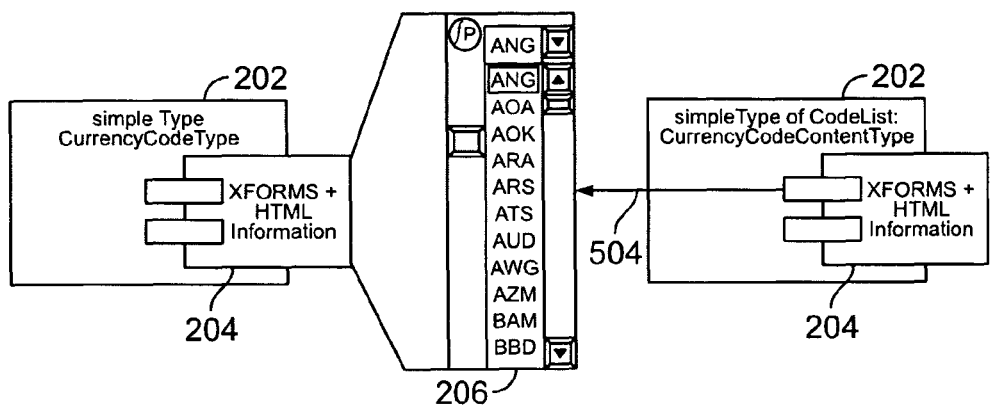

FIG. 5A

```
202
      <xsd:simpleType name="CurrencyCodeType">
        <xsd:annotation>
          <xsd:documentation xml:lang="en">
            <ccts:UniqueIdentifier/>
            <ccts:CategoryCode>QDT</ccts:CategoryCode>
            <ccts:DictionaryEntryName>Currency_ Code. Type</ccts:DictionaryEntryName>
            <ccts:Definition>This type represents the currency.</ccts:Definition>
            <ccts:ObjectClassQualifierName>Currency</ccts:ObjectClassQualifierName>
            <ccts:ObjectClassTermName>Code</ccts:ObjectClassTermName>
            <ccts:PropertyTermName>Type</ccts:PropertyTermName>
          </xsd:documentation>
500     <xsd:appinfo>
          <xforms:select1 ref="./external/iso4217:CurrencyCodeContentType"
502         appearance="minimal">                                                    }
            <xforms:label ref="concat(./xsd:element/xsd:annotation/xsd:documentation/  } 204
              ccts:PropertyQualifierTermName,' ',./xsd:element/xsd:annotation/
              xsd:documentation/ccts:PropertyTermName)"/>
          </xforms:select1>
        </xsd:appinfo>
      </xsd:annotation>
      <xsd:restriction base="xsd:string"/>
    </xsd:simpleType>
```

FIG. 5B

202
```
<xsd:schema targetNamespace="urn:unece:uncefact:...">
    <xsd:simpleType name="CurrencyCodeContentType">
        <xsd:annotation>
            <xsd:documentation/>
            <xsd:appinfo>
                <xforms:item>
510             <xforms:label ref="./xsd:simpleType/xsd:restriction/xsd:enumeration/@value"/>
514             <xforms:value ref="./xsd:simpleType/xsd:restriction/xsd:enumeration/@value"/>
                </xforms:item>
512         </xsd:appinfo>
        </xsd:annotation>
        <xsd:restriction base="xsd:token">        506
            <xsd:enumeration value="ADP">
                <xsd:annotation>
                    <xsd:documentation source="code" xml:lang="en">
                        <ccts:CodeName>Andorran Peseta</ccts:CodeName>
                    </xsd:documentation>
                </xsd:annotation>
            </xsd:enumeration>        506
            <xsd:enumeration value="AED">
                <xsd:annotation>
                    <xsd:documentation source="code" xml:lang="en">
                        <ccts:CodeName>UAE Dirham</ccts:CodeName>
                    </xsd:documentation>
                </xsd:annotation>
            </xsd:enumeration>        506
            <xsd:enumeration value="AFA">
                <xsd:annotation>
                    <xsd:documentation source="code" xml:lang="en">
                        <ccts:CodeName>Afghani</ccts:CodeName>
                    </xsd:documentation>
                </xsd:annotation>
            </xsd:enumeration>
508         ...
        </xsd:restriction>
    </xsd:simpleType>
</xsd:schema>
```

204 (bracket encompasses xforms:item block)

```
<xsd:complexType name="FlightDetails">
  <xsd:annotation>
    <xsd:documentation/>
    <xsd:appinfo>
      <table cellspacing="0" cellpadding="2" border="0" class="box">
        <tr>
          <th colspan="11" class="boxheader">
            <xforms:label ref="concat(./xsd:element/xsd:annotation/xsd:documentation/
              ccts:PropertyQualifierTermName, ' ', ./xsd:element/xsd:annotation/
              xsd:documentation/ccts:PropertyTermName)"/>
          </th>
        </tr>
        <tr>
          <td><xforms:input ref="./xsd:complexType/xsd:sequence/       }1220
            xsd:element[@name='Date']"/></td>
1230      <td><xforms:input ref="./xsd:complexType/xsd:sequence/
            xsd:element[@name='AircraftTypeCode']"/></td>
          <td style="width:5px;border-right:1px solid #CCCCCC;"> </td>
          <td style="width:5px;"> </td>
          <td>
            <xforms:input ref="./xsd:complexType/xsd:sequence/
              xsd:element[@name='EconomyClassMaximumSeatsValue']"/>
          </td>
          <td style="width:5px;border-right:1px solid #CCCCCC;"> </td>
          <td style="width:5px;"> </td>
          <td>
            <xforms:input ref="./xsd:complexType/xsd:sequence/
              xsd:element[@name='BusinessClassMaximumSeatsValue']"/>
          </td>
          <td style="width:5px;border-right:1px solid #CCCCCC;"> </td>           }1210
          <td style="width:5px;"> </td>
          <td>
            <xforms:input ref="./xsd:complexType/xsd:sequence/
              xsd:element[@name='FirstClassMaximumSeatsValue']"/>
          </td>
        </tr>
        <tr>
          <td colspan="2">
            <xforms:input ref="./xsd:complexType/xsd:sequence/
              xsd:element[@name='AirfareAmount']"/>
          </td>
          <td style="width:5px;border-right:1px solid #CCCCCC;"> </td>
          <td style="width:5px;"> </td>
          <td>
            <xforms:input ref="./xsd:complexType/
              xsd:sequence/xsd:element[@name='EconomyClassOccupiedSeatsValue']"/>
          </td>
          <td style="width:5px;border-right:1px solid #CCCCCC;"> </td>
          <td style="width:5px;"> </td>
          <td>
            <xforms:input ref="./xsd:complexType/xsd:sequence/
              xsd:element[@name='BusinessClassOccupiedSeatsValue']"/>
          </td>
```

```
            <td style="width:5px;border-right:1px solid #CCCCCC;"> </td>
            <td style="width:5px;"> </td>
            <td>
                <xforms:input ref="./xsd:complexType/xsd:sequence/
                    xsd:element[@name='FirstClassOccupiedSeatsValue']"/>
            </td>
        </tr>
    </table>
    </xsd:appinfo>
</xsd:annotation>
<xsd:sequence>
    <xsd:element name="Date" type="sfly:DateType">
        <xsd:annotation>
            <xsd:documentation xml:lang="en">
                <ccts:Description>This is the date of the flight.</ccts:Description>
                <ccts:RepresentationTerm>Date</ccts:RepresentationTerm>
                <ccts:ObjectClassTermName>Flight</ccts:ObjectClassTermName>
                <ccts:PropertyTermName>Date</ccts:PropertyTermName>
                <ccts:DictionaryEntryName>Flight. Date. Date</ccts:DictionaryEntryName>
            </xsd:documentation>
        </xsd:annotation>
    </xsd:element>
    <xsd:element name="AirfareAmount" type="sfly:AmountType">
        <xsd:annotation>
            <xsd:documentation xml:lang="en">
                <ccts:Description>This is the amount of the airfare of a flight.
                </ccts:Description>
                <ccts:DictionaryEntryName>Flight. Airfare. Amount</ccts:DictionaryEntryName>
                <ccts:PropertyTermName>Amount</ccts:PropertyTermName>
                <ccts:PropertyQualifierTermName>Airfare</ccts:PropertyQualifierTermName>
                <ccts:RepresentationTerm>Amount</ccts:RepresentationTerm>
                <ccts:ObjectClassTermName>Flight</ccts:ObjectClassTermName>
            </xsd:documentation>
        </xsd:annotation>
    </xsd:element>
    <xsd:element name="AircraftTypeCode" type="sfly:AircraftTypeCodeType">
        <xsd:annotation>
            <xsd:documentation xml:lang="en">
                <ccts:Description>This is the type code of the aircraft
                    for the flight.</ccts:Description>
                <ccts:ObjectClassTermName>Flight</ccts:ObjectClassTermName>
                <ccts:PropertyTermName>Type</ccts:PropertyTermName>
                <ccts:PropertyQualifierTermName>Aircraft</ccts:PropertyQualifierTermName>
                <ccts:DictionaryEntryName>Flight. Aircraft_ Type. Code
                    </ccts:DictionaryEntryName>
                <ccts:RepresentationTerm>Code</ccts:RepresentationTerm>
            </xsd:documentation>
        </xsd:annotation>
    </xsd:element>
    <xsd:element name="EconomyClassMaximumSeatsValue" type="sfly:ValueType"
        minOccurs="0">
        <xsd:annotation>
            <xsd:documentation xml:lang="en">
```

1210 (braces around top section)

```
            <ccts:Description>This is the value of the maximum seats in the economy
                class of a flight.</ccts:Description>
            <ccts:DictionaryEntryName>Flight. Economy Class_ Maximum_
                Seats. Value</ccts:DictionaryEntryName>
            <ccts:PropertyQualifierTermName>Economy Class
                Maximum</ccts:PropertyQualifierTermName>
            <ccts:RepresentationTerm>Value</ccts:RepresentationTerm>
            <ccts:PropertyTermName>Seats</ccts:PropertyTermName>
            <ccts:ObjectClassTermName>Flight</ccts:ObjectClassTermName>
        </xsd:documentation>
    </xsd:annotation>
</xsd:element>
<xsd:element name="EconomyClassOccupiedSeatsValue" type="sfly:ValueType"
    minOccurs="0">
    <xsd:annotation>
        <xsd:documentation xml:lang="en">
            <ccts:Description>This is the value of the occupied seats in the economy
                class of a flight.</ccts:Description>
            <ccts:ObjectClassTermName>Flight</ccts:ObjectClassTermName>
            <ccts:RepresentationTerm>Value</ccts:RepresentationTerm>
            <ccts:DictionaryEntryName>Flight. Economy Class_ Occupied_
                Seats. Value</ccts:DictionaryEntryName>
            <ccts:PropertyQualifierTermName>Economy Class
                Occupied</ccts:PropertyQualifierTermName>
            <ccts:PropertyTermName>Seats</ccts:PropertyTermName>
        </xsd:documentation>
    </xsd:annotation>
</xsd:element>
<xsd:element name="BusinessClassMaximumSeatsValue" type="sfly:ValueType"
    minOccurs="0">
    <xsd:annotation>
        <xsd:documentation xml:lang="en">
            <ccts:Description>This is the value of the maximum seats in the business class
                of a flight.</ccts:Description>
            <ccts:ObjectClassTermName>Flight</ccts:ObjectClassTermName>
            <ccts:DictionaryEntryName>Flight. Business Class_ Maximum_ Seats.
                Value</ccts:DictionaryEntryName>
            <ccts:PropertyTermName>Seats</ccts:PropertyTermName>
            <ccts:RepresentationTerm>Value</ccts:RepresentationTerm>
            <ccts:PropertyQualifierTermName>Business Class
                Maximum</ccts:PropertyQualifierTermName>
        </xsd:documentation>
    </xsd:annotation>
</xsd:element>
<xsd:element name="BusinessClassOccupiedSeatsValue" type="sfly:ValueType"
    minOccurs="0">
    <xsd:annotation>
        <xsd:documentation xml:lang="en">
            <ccts:Description>This is the value of the occupied seats in the business
                class of a flight.</ccts:Description>
            <ccts:PropertyQualifierTermName>Business Class Occupied
                </ccts:PropertyQualifierTermName>
            <ccts:DictionaryEntryName>Flight. Business Class_ Occupied_ Seats. Value
```

FIG. 12C

```xml
                </ccts:DictionaryEntryName>
                <ccts:RepresentationTerm>Value</ccts:RepresentationTerm>
                <ccts:PropertyQualifierTermName>Occupied</ccts:PropertyQualifierTermName>
                <ccts:ObjectClassTermName>Flight</ccts:ObjectClassTermName>
                <ccts:PropertyTermName>Seats</ccts:PropertyTermName>
            </xsd:documentation>
        </xsd:annotation>
    </xsd:element>
    <xsd:element name="FirstClassMaximumSeatsValue" type="sfly:ValueType" minOccurs="0">
        <xsd:annotation>
            <xsd:documentation xml:lang="en">
                <ccts:Description>This is the value of the maximum seats in the first class
                    of a flight.</ccts:Description>
                <ccts:PropertyQualifierTermName>First Class Maximum
                    </ccts:PropertyQualifierTermName>
                <ccts:RepresentationTerm>Value</ccts:RepresentationTerm>
                <ccts:ObjectClassTermName>Flight</ccts:ObjectClassTermName>
                <ccts:PropertyTermName>Seats</ccts:PropertyTermName>
                <ccts:DictionaryEntryName>Flight. First Class_ Maximum_ Seats. Value
                    </ccts:DictionaryEntryName>
            </xsd:documentation>
        </xsd:annotation>
    </xsd:element>
    <xsd:element name="FirstClassOccupiedSeatsValue" type="sfly:ValueType"
        minOccurs="0">
        <xsd:annotation>
            <xsd:documentation xml:lang="en">
                <ccts:PropertyQualifierTermName>First Class Occupied
                    </ccts:PropertyQualifierTermName>
                <ccts:RepresentationTerm>Value</ccts:RepresentationTerm>
                <ccts:PropertyQualifierTermName>Occupied</ccts:PropertyQualifierTermName>
                <ccts:PropertyTermName>Seats</ccts:PropertyTermName>
                <ccts:DictionaryEntryName>Flight. First Class_ Occupied_ Seats. Value
                    </ccts:DictionaryEntryName>
                <ccts:ObjectClassTermName>Flight</ccts:ObjectClassTermName>
            </xsd:documentation>
        </xsd:annotation>
    </xsd:element>
</xsd:sequence>
</xsd:complexType>
```

```
<xsd:element name="Date" type="sfly:DateType">
    <xsd:annotation>
        <xsd:documentation xml:lang="en">
            <ccts:Description>This is the date of the flight.</ccts:Description>
            <ccts:RepresentationTerm>Date</ccts:RepresentationTerm>
            <ccts:ObjectClassTermName>Flight</ccts:ObjectClassTermName>
            <ccts:PropertyTermName>Date</ccts:PropertyTermName>
            <ccts:DictionaryEntryName>Flight. Date. Date</ccts:DictionaryEntryName>
        </xsd:documentation>
    </xsd:annotation>
</xsd:element>
```

```
<xsd:simpleType name="DateType">
    <xsd:annotation>
        <xsd:documentation xml:lang="en">
            <ccts:CategoryCode>RT</ccts:CategoryCode>
            <ccts:DictionaryEntryName>Date_ Date Time. Type</ccts:DictionaryEntryName>
            <ccts:Definition>DateType represents one calendar day according the
                Gregorian calendar.</ccts:Definition>
            <ccts:ObjectClassQualifierName ID="1">Date</ccts:ObjectClassQualifierName>
            <ccts:ObjectClassTermName>Date Time</ccts:ObjectClassTermName>
            <ccts:PropertyTermName>Type</ccts:PropertyTermName>
        </xsd:documentation>
        <xsd:appinfo>                    1260
1270 ──── <xforms:input ref=" ">
            <xforms:label ref=" concat (./xsd:element/xsd:annotation/xsd:documetation/
                ccts:PropertyQualifierTermName, ' ', ./xsd:element/xsd:annotation/
                xsd:documentation/ccts:PropertyTermName)"/>           } 1250
            <xforms:hint ref="./xsd:simpleType/xsd:annotation/xsd:documentation/
1280 ────    ccts:Definition"/>
        </xforms:input>
        </xsd:appinfo>
    </xsd:annotation>
    <xsd:restriction base="xsd:date"/>
</xsd:simpleType>
```

FIG. 12F

LAYOUT INFORMATION FOR DATA COMPONENT

CROSS-REFERENCE TO RELATED APPLICATION

This application claims priority from U.S. Provisional Application Ser. No. 60/627,013, filed Nov. 10, 2004, the contents of which are incorporated herein by reference.

TECHNICAL FIELD

The description relates to layout information to be used in displaying a data component.

BACKGROUND

Many aspects of electronic communication, and in particular electronic commerce, is based on business documents that parties can exchange over a computer connection. A big problem in current e-Business is the variety in structure and description of business information and business documents. The absence of uniform and standardized methods for the common representation of the structure and semantics of business data led to today's situation where there is an increasing growth of different representations of electronic business information and documents. Currently it is not possible to exchange business documents electronically between two business partners without previous coordination and manual mapping between different document structures and semantics. A world-wide accepted syntax for representation exists with extensible markup language (XML), but this does not solve the problem of non-uniform semantics and structure.

Some business documents are based on reusable building blocks that define the semantics of the document data. An example of a standard that defines such building blocks is the electronic business XML (ebXML) Core Components Technical Specification issued by the United Nations Centre for Trade Facilitation and Electronic Business, which specification is hereafter referred to as CCTS. The CCTS is the first standard which combines all necessary aspects for human legibility and automatic machine processing so that an integrated interoperability can be guaranteed. The CCTS based building blocks are syntax free and very flexible, because they are based on a modular concept. Business information can be assembled for all demands by reusable building blocks. "Syntax free" means that these building blocks can be generated in arbitrary representations, like XML, ABAP Objects or Java classes. However, the semantics described by the CCTS do not change. This guarantees one general naming convention for the unambiguous composition of semantic information. This mechanism is comparable with the grammar and words of a naturally-spoken language, because a naturally-spoken language can also be represented in many different ways (by writing or by speech), and the semantics are always the same.

The layout and form information for the visual presentation of current business documents is typically described in an external script file. The script file is used when the document is printed, or displayed in a graphical user interface (GUI). Examples of these files include extensible stylesheet language transformation (XSLT) files, XSL formatting object (XSL:FO) files or extensible data processor (XDP) files. Such files are separate from, and describe layout properties of, the business document, such as a purchase order or an invoice.

One disadvantage with the use of external script files is that there is no tight conjunction of the reusable building blocks the XML schema (like address and location of a business document) and the reusable parts of the layout information. If a new document is to be assembled using an XML schema, complete new layout information must be developed using a script language. Furthermore, current browsers understand only the layout information and do not handle the semantics and structure of reusable building blocks based on XML schemas. Such browsers do not perform a validation of incoming XML based business documents, and do not generate XML based building blocks in a very generic way so that everyone (humans and applications) can understand the business documents.

SUMMARY

The invention relates to layout information for data components. The invention may allow business documents and their forms to be modeled in the same modular way and at the same time. The invention may provide business documents based on reusable and flexible building blocks that are semantically named and structured. The invention may provide building blocks that include relative form information for the visual representation at the user interface.

In a first general aspect, the invention is a method of providing layout information to be used in generating a display of data in a graphical user interface. The method comprises storing, in a computer system that is configured to contain schema definitions for several data components, layout information for at least one of the data components in the schema definition for the at least one data component.

In selected embodiments, the layout information may define a selection control, a label or a help function for the data component.

In selected embodiments, the layout information refers to the schema definition for the data component.

In a second general aspect, the invention is a method of providing display of data in a graphical user interface. The method comprises accessing layout information for a data component, the layout information being included in a schema definition for the data component. The method comprises providing, using the accessed layout information, an instance of the data component for display in a graphical user interface.

In selected embodiments, a browser loads and validates an XML instance and thereafter displays the data component. A browser may form an outgoing instance based on user input made using the generated graphical user interface.

Advantages of the systems and techniques described herein may include any or all of the following: Providing improved use of layout information for a data component; providing tight coupling of semantic and relative layout of reusable core components; providing effective modeling of business information by including structure, semantic, definition and relative layout of a core component in a single XML Schema Definition (XSD) artifact; providing that CCTS-based XSD artifacts that have embedded layout information can be developed in a modeling context; providing extensive reusability of components for assembling structure, semantic and layout of any kind of business information; providing implicit reusability of any kind of XSD artifact information and structure; providing that XSD artifacts, GUI layout, printouts and XML instances can share a common understanding of semantic and layout; providing that only a single schema is needed for semantic, structure, validation and layout information; eliminating a separation of layout script and XSD schema; providing a technology for data interpretation, validation and visualization that makes development of user interfaces for business data and business applications easier and more effective; and providing a browser with which business information based on standardized schema definitions can be downloaded, validated, interpreted and visualized, and which can generate outgoing instances of such business information.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 5A-C show a schema definition for a second data component that refers to a code list;

FIGS. 12A-F show schema definitions.

Like reference numerals in the various drawings indicate like elements.

DETAILED DESCRIPTION

Figure 1:
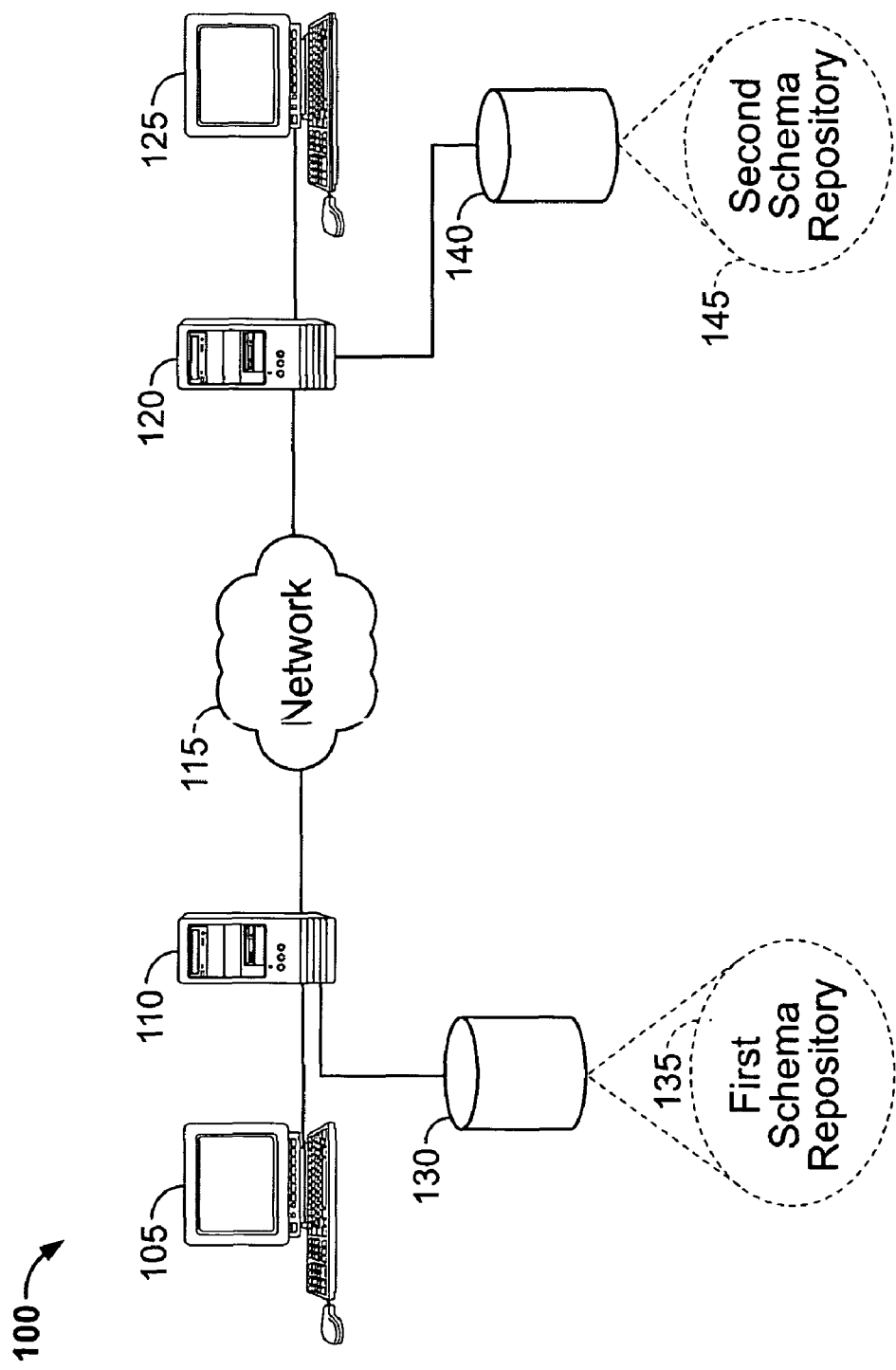
FIG. 1 is a block diagram of a computer system that uses one or more business communication schemas.

FIG. 1 is a block diagram of a system 100 for transacting electronic business using one or more business communication schemas. Particularly, the system 100 can handle documents where layout information for a data component is included in a schema definition for the data component, as will be described below.

The system 100 includes a first monitor 105 connected to a first computer 110 and a second monitor 125 connected to a second computer 120. Electronic business communications between the first computer 110 and the second computer 120 are conducted over a network 115, such as the Internet, in accordance with a business communication schema. To facilitate electronic business communications, the first computer 110 includes a data storage device 130 containing a first schema repository 135 and the second computer 120 includes a data storage device 140 containing a second schema repository 145. Each of the first schema repository 135 and the second schema repository 145 store metadata describing one or more formats defined by a business communication schema.

The monitor 105 displays user interfaces for allowing a user to enter or otherwise define business data to be included in an electronic document. The first computer 110 generates the electronic document in accordance with the metadata stored in the first schema repository 135. In particular, the first computer 110 organizes the data entered by the user according to a communications schema format defined in the first schema repository 135. The generated electronic document can then be transmitted over the network 115 to a receiving entity, such as the second computer 120. The second computer 120 is capable of interpreting received electronic documents in accordance with the metadata stored in the second schema repository 145. In particular, the second computer 120 interprets data contained in a received electronic document according to a communications schema format defined in the second schema repository 145.

One or more communications schemas can be defined in each schema repository 135 and 145. In some cases, two enterprises that wish to transact electronic business agree to use a particular communication schema that both enterprises support. In other words, the same communication schema is defined in both the first schema repository 135 and the second schema repository 145. In such a case, an electronic document generated by the first computer 110 using the particular communication schema can be interpreted by the second computer 120 using the metadata in the second schema repository 145, and the monitor 125 can display user interfaces that include the data contained in the electronic document.

Figure 2:
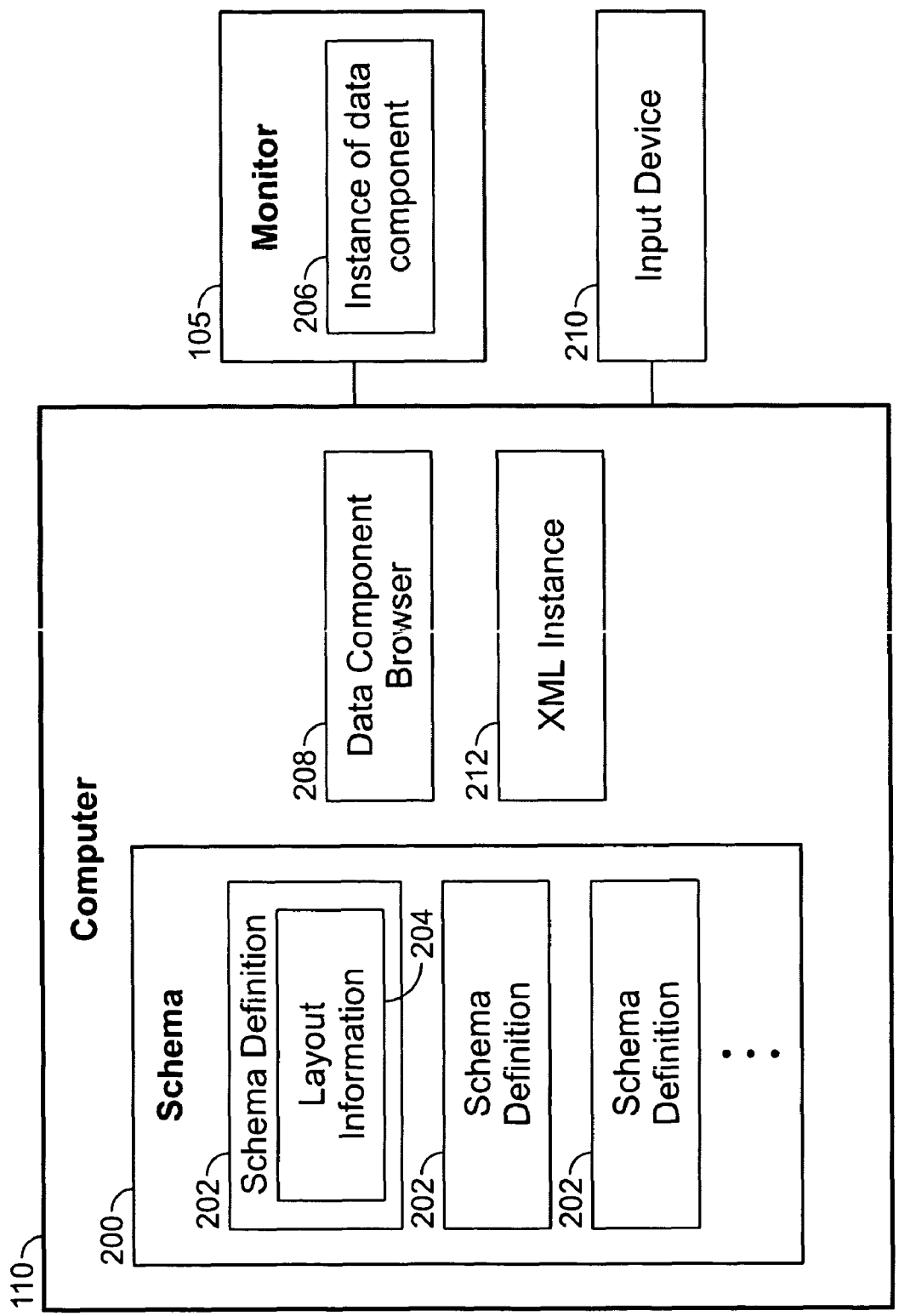
FIG. 2 is a block diagram of a computer system that uses layout information for a data component.

FIG. 2 is an example of components used by any or all participants in the system 100, such as the first computer 110. For simplicity, the data repository 130 and the first schema repository 135 are not explicitly shown. Here, the computer 110 uses a schema 200 that contains one or more schema definitions 202. The schema definitions 202 relate to, and define semantics of, data components that can be used in business documents handled by the computer 110. For example, each of the data components may correspond to an address, a date, an amount, and so on. Moreover, the schema definition 202 for a particular data component may include layout information 204 for the data component. The layout information 204 defines the form of the data component when it is printed or displayed. The layout information may be based on XForms, extensible hypertext markup language ((X)HTML), XSLT, XPath or other relevant XML-based meta languages. Alternatively, the layout information can be based on XSL:FO or another layout script language.

Using the layout information 204, the computer 110 can display an instance 206 of the data component on the monitor 105. Data components may be displayed using a data component browser 208 which will be described later. A user can enter information in the computer 110 using an input device 210. Particularly, if the user edits the data component, such as by entering a date or an amount, the computer 110 can generate an XML instance 212 that includes the user input. As another example, the computer 110 receives the XML instance 212 over the network for display on the monitor.

Figure 3:
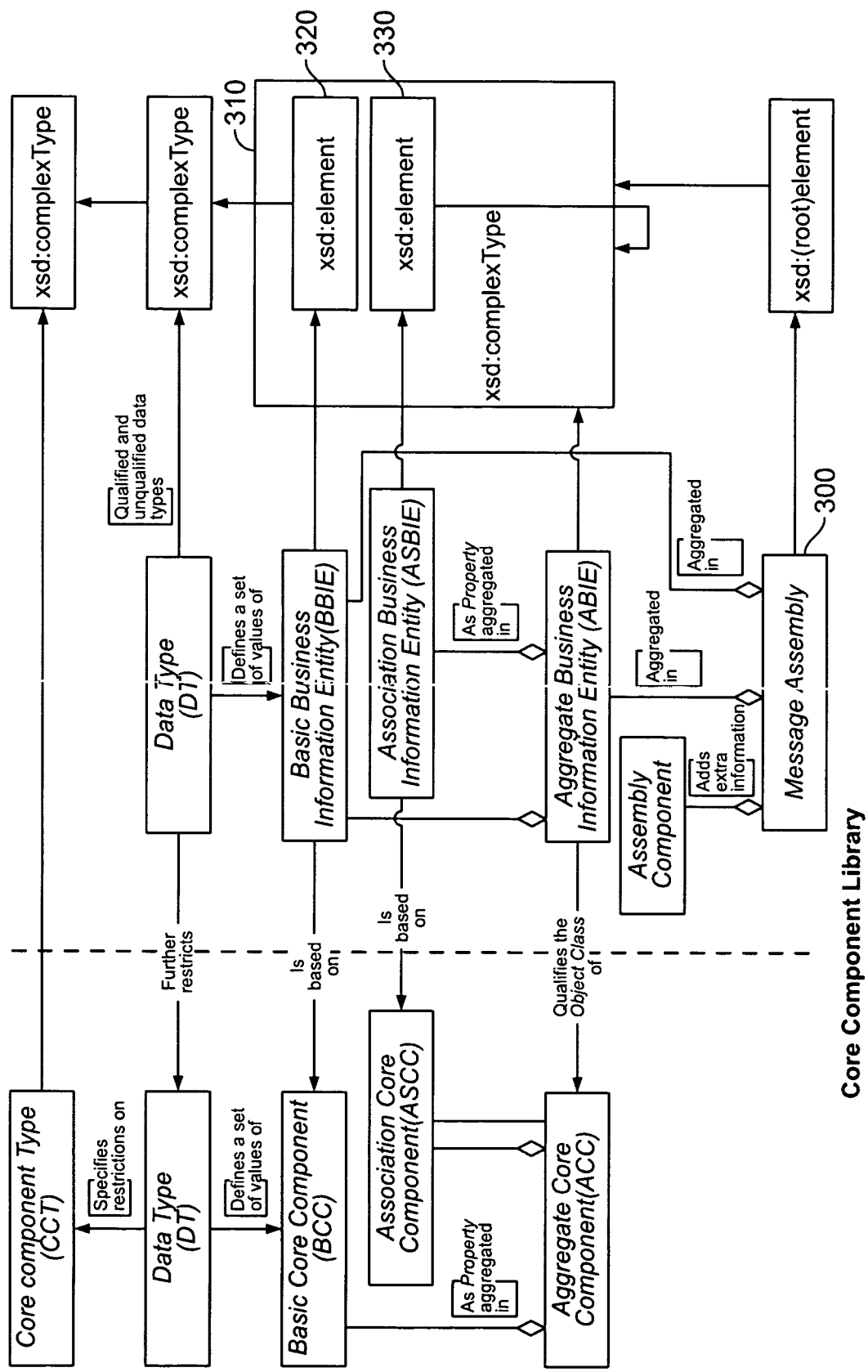
FIG. 3 schematically illustrates relationships between core components, business information entities, and schema definitions.

CCTS, including its naming and design rules, makes it possible to define XSD based reusable building blocks (here called XSD artifacts) for assembling any kind of business information and/or business documents. The schema definition 202 and the layout information 204 are examples of such XSD artifacts. Such building blocks are based on an XML schema, using consistent rules for naming and structuring, to give clear and categorized information about the generic and context-specific parts. According to CCTS, schemas can be developed from fully conformant Business Information Entities (BIEs) that are based on fully conformant Core Components (CCs). A CC is a building block for the creation of a semantically correct and meaningful information exchange package. The CC contains only the information pieces necessary to describe a specific concept. A BIE is a piece of business data or a group of pieces of business data with a unique business semantic definition. When a CC is used in a real business circumstance it serves as the basis of a BIE. Additional aspects of CCTS will now be described with reference to FIG. 3, which shows relationships between CCs, BIEs and XSD artifacts. CCs, BIEs, CC types (CCTS) and data types (DTs) are considered CCTS constructs. XSD constructs, in contrast, are here named xsd:types, xsd:elements and xsd:attributes. The following basic principles apply to these components.

1. A message assembly 300 is represented as a complex type designated as the root element of an XML message.

2. An Aggregate BIE (ABIE) is defined as a complex type and is a collection of related pieces of business information that together convey a distinct business meaning in a specific business context.

3. An Association BIE (ASBIE) is a BIE that represents a complex business characteristic of a specific object class in a specific business context, and has a unique business semantic definition. The ASBIE is declared as a local element within the complex type representing the associated ABIE. The ASBIE element is in itself based on (is of type) complex type of the associated ABIE.

4. A Basic BIE (BBIE) represents a singular business characteristic of a specific object class in a specific business context. It has a unique Business Semantic definition and is derived from a Basic CC. The BBIE is declared as a local element within the complex type representing the parent ABIE, and is based on an (is of type) unqualified or qualified DT.

5. A DT defines the set of valid values that can be used for a particular BCC property or BIE property. It is defined by specifying restrictions on the CC type that forms the basis of the DT. The DT is declared as a complex type or simple type. Whenever the facets of the built-in data type are equivalent to the built-in supplementary components for that data type, xsd:built-in data types will be used.

6. A qualified DT for code lists, which is defined as a simple type, is based on a simple type of code list content.

7. A qualified DT for identifier schemes, which is defined as a simple type, is based on a simple type of identifier scheme content.

The primary types of CCTS-based components are the unqualified data types, which are the representation terms defined in the standard named ISO 11179. Every unqualified data type is based on one of the 10 different CC types. CCTS defines the structure of each data type in a common way by content and some extra features, called supplementary components. The values of the content and/or of the supplementary components can be restricted by defining unqualified data types. The unqualified data types are given in the following table:

| Representation Type | Definition |
|---|---|
| Amount | A number of monetary units specified in a currency where the unit of currency is explicit or implied. |
| Binary Object | |
| Code | A character string (letters, figures or symbols) that for brevity and/or language independency may be used to represent or replace a definitive value or text of an attribute. Codes usually are maintained in code lists per attribute type (e.g. color). |
| Date | A day within a particular calendar year. Note: Reference ISO 8601 for format. |
| DateTime | A timestamp, consisting of a date and time. Reference ISO 8601 for format. |

-continued

| Representation Type | Definition |
|---|---|
| Graphic | |
| Identifier | A character string used to identify and distinguish uniquely, one instance of an object within an identification scheme from all other objects within the same scheme. |
| Indicator | A list of two, and only two, values which indicate a condition such as on/off; true/false etc. (synonym: "boolean") |
| Measure | A numeric value determined by measuring an object. Measures are specified with a unit of measure. The applicable units of measure is taken from UN/ECE Rec. 20. |
| Name | A word or phrase that constitutes the distinctive designation of a person, place, thing or concept. |
| Picture | |
| Percent | A rate expressed in hundredths between two values that have the same unit of measure. |
| Quantity | A number of non-monetary units. It is associated with the indication of objects. Quantities need to be specified with a unit of quantity. |
| Rate | A quantity or amount measured with respect to another measured quantity or amount, or a fixed or appropriate charge, cost or value e.g. US Dollars per hour, US Dollars per EURO, kilometer per liter, etc. |
| Sound | |
| Text | A character string generally in the form of words of a language. |
| Time | The time within a (not specified) day. Reference ISO 8601:1988. |
| Video | |

CCTS describes only the structure, semantic and the XML-based representation of reusable building blocks, but not how to effectively visualize the information. However, using a consistent definition of embedded layout information in every XSD artifact, it is possible to achieve effective visualization and visual usage in design- and run-time of CCTS-based building blocks. Each XSD artifact of every CCTS based building block may be configured to describe the semantic, naming, structure and additionally the relative layout information for it. When such building blocks are assembled together, they define not only the complete business semantic and structure of a business document, but also the layout of the business document. Accordingly, the computer 110 processes the schema definition 202, including the layout information 204, to generate a display of the instance 206 in the GUI.

Figure 4:
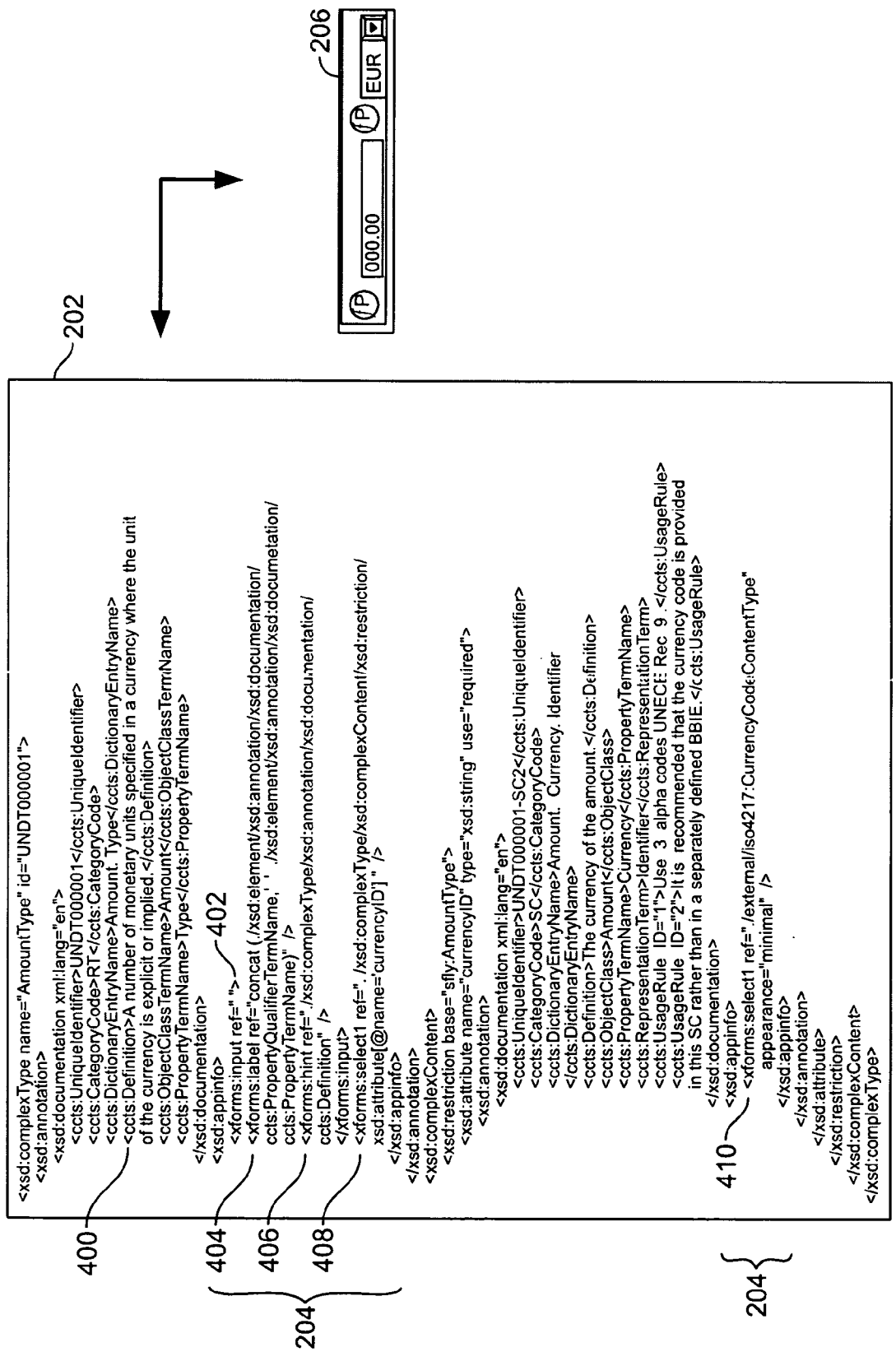
FIG. 4 shows a schema definition for a first data component and a displayed instance of the first data component.

An example of such processing will now be described with reference to FIG. 4 that shows an example of the schema definition 202 including the layout information 204, and the corresponding displayed data component instance 206. The schema definition is the complete complex type of a unqualified data type, here "Amount. Type" which according to definition 400 is a "number of monetary units specified in a currency where the unit of the currency is explicit or implied." The layout information is defined directly in the annotation/appinfo of the complex type (or simple type, in another example).

The complex type has the embedded layout information 204 in two places. The first portion of the layout information (complexType/annotation/appinfo) is for the representation of the complete type and the second layout information (complexType/annotation/appinfo) is for the supplementary component, which is represented as an attribute.

A UI control xforms:input 402 creates an input field for obtaining the value of the content component "Amount. Content". The characteristics of xforms:input are based on the built-in data type "xsd:decimal". Additionally, the layout information 204 defines some further information for the GUI to show:

A. An xforms:label 404 selects the UI label information from the implicit CCTS based documentation by a relative XPath instruction. Accordingly, label information can be defined by referring to the rest of the schema definition for the data component. In this case the values of ccts:PropertyQualifierTermName and ccts:PropertyTermName will be selected.

B. An xforms:hint 406 selects the UI tool tip information from the ccts:definition by a relative XPath instruction. This provides a help function for a user that is entering or reading the data component.

C. An xforms:select 408 selects the additional layout information for the representation of the supplementary component "currencyID". The xforms:select references the attribute construct of the supplementary component "currencyID".

For detailed representation of each supplementary component, additional layout information is defined within the attribute declaration, which is here the lower of the two portions of layout information 204. For example, an xforms:select1 410 defines a selection control in order to create selection controls that return an atomic value. Here, the selection returns a currency code and the instance 206 includes an input field for a currency amount and a drop-down list box for a currency code (currently showing EUR for euro). The layout information refers to an external code list to get the complete list for the selection of one code. The code list construct will be described below.

Schema definitions that are not of complex type are of simple type. The simple type of an unqualified and qualified data type does not have additional attributes for the representation of supplementary components; it includes only the value space of an element. This value space, in turn, can be based on a specific built-in data type and some additional facets for the restriction of value and lexical characteristics.

Unqualified or qualified data types may refer to specific code lists or identifier schemes by their attributes or content components. Such code lists or identifier schemes are defined as external schema modules. FIGS. 5A-C show an example thereof, where a qualified data type "Currency. Code. Type" refers to an external currency code list. In FIG. 5A, the schema definition 202 is of the simpleType: CurrencyCode Type and the layout information 204 includes XFORMS and HTML information. The instance 206 of the data component is a drop-down list box for the currency codes, currently showing alternative codes in the range ANG to BBD.

The layout information of the unqualified data type itself defines the kind of selection control by a specific xForms control. FIG. 5B shows an example of the schema definition 202 for the currency code type. An xforms:select1 500 defines a selection control for creating selection controls that return an atomic value. Here, the select returns a currency code. Reference is made, by an XPath element, to an external code list to get the complete list for the selection of one code. Additionally, an xforms:label 502 defines a label, extracting the label information from the implicit CCTS-based documentation using an relative XPath construct. FIG. 5A shows a reference 504 from the unqualified data type to the external XML schema module that has the specific code list.

FIG. 5C, in turn, shows the schema definition of the external schema module of the currency code list. The schema definition includes the layout information 204 for the specific representation of the currency codes and several enumeration values 506, each corresponding to one of the currency codes ADP, AED and AFA. The list of enumeration values is here truncated, as indicated by an ellipsis 508. An xforms:item 510 encodes the available choices defined by all enumeration values. The enumeration values are represented by an xforms:value control 512. An xforms:label 514 supplies the complete name of each code value. Accordingly, processing the exemplary schema definition 202 and layout information 204 shown in FIGS. 5B and 5C results in display of the instance 206 shown in FIG. 5A.

BBIEs and/or ASBIEs (see FIG. 3) can be combined into an ABIE. Layout information embedded in these respective entities is then used in visually representing the ABIE. This means that assembling the schema of the ABIE also provides the corresponding UI layout. Accordingly, only one modeling needs to be performed.

The ABIE is a complex object class and is a collection of related pieces of business information that together convey a distinct business meaning in a specific business context. The ABIE is defined as an xsd:complexType 310. An ABIE is defined as containing at least one BIE Property. A BIE Property is either a BBIE or an ASBIE. A BBIE is declared as a local declared element 320 within the complex type 310 and is based on the xsd:complexType or xsd:simpleType of a specific unqualified or qualified data type. An ASBIE also is declared as a local element 330 within the complex type 310. The ASBIE itself is based on an xsd:complexType of the associated ABIE.

The xsd:complexType of the ABIE defines the layout information for the correct visual representation of the ABIE, including all collected related pieces (BBIEs and ASBIES) within the ABIE. This layout information may include xforms controls for the correct representation of the sequence of BBIEs or ASBIEs and some additional information for further layout of the complete ABIE (like frame, tabs, header, etc.). For the specific representation of the child nodes (BBIEs and/or ASBIEs), the xforms control refers to the equivalent complex types or simple types. The complex or simple types on which the BBIEs or ASBIEs are based include the further layout information. The specific layout information of a BBIE node is defined in the simple or complex types of the associated unqualified or qualified data type on which the BBIE is based. Similarly, the layout information of an ASBIE node is defined in the complex types of the associated ABIE on which the ASBIE is based.

Figure 11:
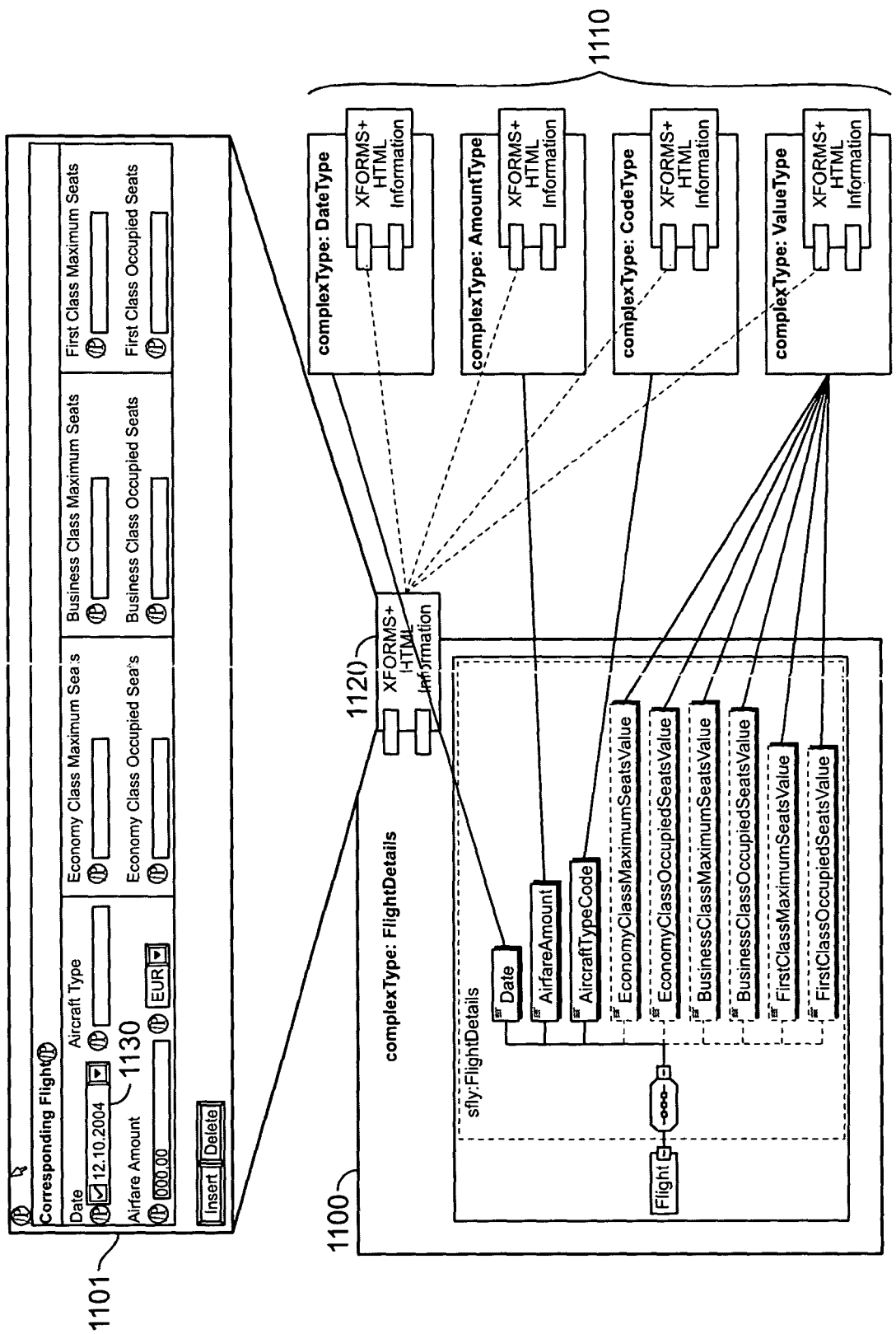
FIG. 11 schematically shows schema definitions and a displayed instance of a data component.

FIG. 11 schematically shows the assembly of an ABIE and the implicit references of layout information to all relevant child nodes. A "Flight. Details" ABIE 1100 appears as ABIE 1101 when printed or displayed in a GUI. The ABIE 1100 has several BBIEs 1110 associated with it. The BBIEs are based on qualified data types. Embedded in the ABIE is layout information 1120 that generally defines the frame and the tabs of this ABIE. The layout information 1120 further defines the order of the BBIEs and includes detailed information of each BBIE. For example, the detailed information is label information (xforms:label) or help information (xforms:hint). Detailed information can be selected from the implicit CCTS-based documentation by a relative XPath instruction. The detailed information about the representation of each BBIE comes from the specific unqualified data types. Therefore, each layout construct of each BBIE refers to the specific complex or simple types of the associated data types.

FIGS. 12A-D includes an example of a complex type 1200 for the ABIE 1100. The complex type is an XSD artefact that includes the complete construct of layout information for the ABIE. Particularly, layout information 1210 in the complex type 1200 is shown in FIGS. 12A and 12B. An xforms:input 1220 refers to a specific element that represents the particular BBIE or ASBIE. Here, the xforms:input 1220 refers to a "Date" element. A <td> tag 1230 indicates that the "Date" element will be placed in a table cell. Referring briefly to FIG. 11, the displayed ABIE 1101 includes a "Date" element 1130.

The "Date" element can be declared as a DateType element, for example using a declaration 1230 as shown in FIG. 12E. By its definition, the element represents "the date of the flight." FIG. 12F, in turn, includes an XSD artefact 1240 for the DateType. The XSD artefact 1240 includes a layout information 1250. Particularly, an xforms:input 1260 creates the input field for obtaining the value of the component. An xforms:label 1270 selects the UI label information from the implicit CCTS-based documentation by a relative XPath instruction. Here, the values of ccts:PropertyQualifierTermName and ccts:PropertyTermName will be selected. An xforms:hint 1280 selects the UI tool tip information (a help function) from ccts:Definition by a relative XPath instruction.

The layout information 1210 for the ABIE 1100 refers to several other elements besides "Date," such as "AircraftTypeCode" and "EconomyClassMaximumSeatsValue". Similarly to the "Date" element, these components have corresponding declarations and type definitions. Thus, the layout information for all such components is used in displaying the ABIE 1101.

With reference again to FIG. 2, the system may include a browser 208 for handling and displaying the data components. The browser can parse XSD artifacts of reusable building blocks and generate a GUI with the embedded relative layout information of every building block. As a particular example, the browser can perform at least the following three functions:

1. Load an CCTS-based XML schema with embedded layout information and represent a CCTS-based layout in a UI (web browser).

2. Load an incoming CCTS-based XML instance, validate it against the CCTS-based XML schema and, if the validation is correct, represent the result within the CCTS based layout shown by the UI (web browser).

3. Generate an outgoing CCTS-based XML instance from entered and validated values in the CCTS-based layout shown by an UI (web browser).

Figures 6, 7, 8:
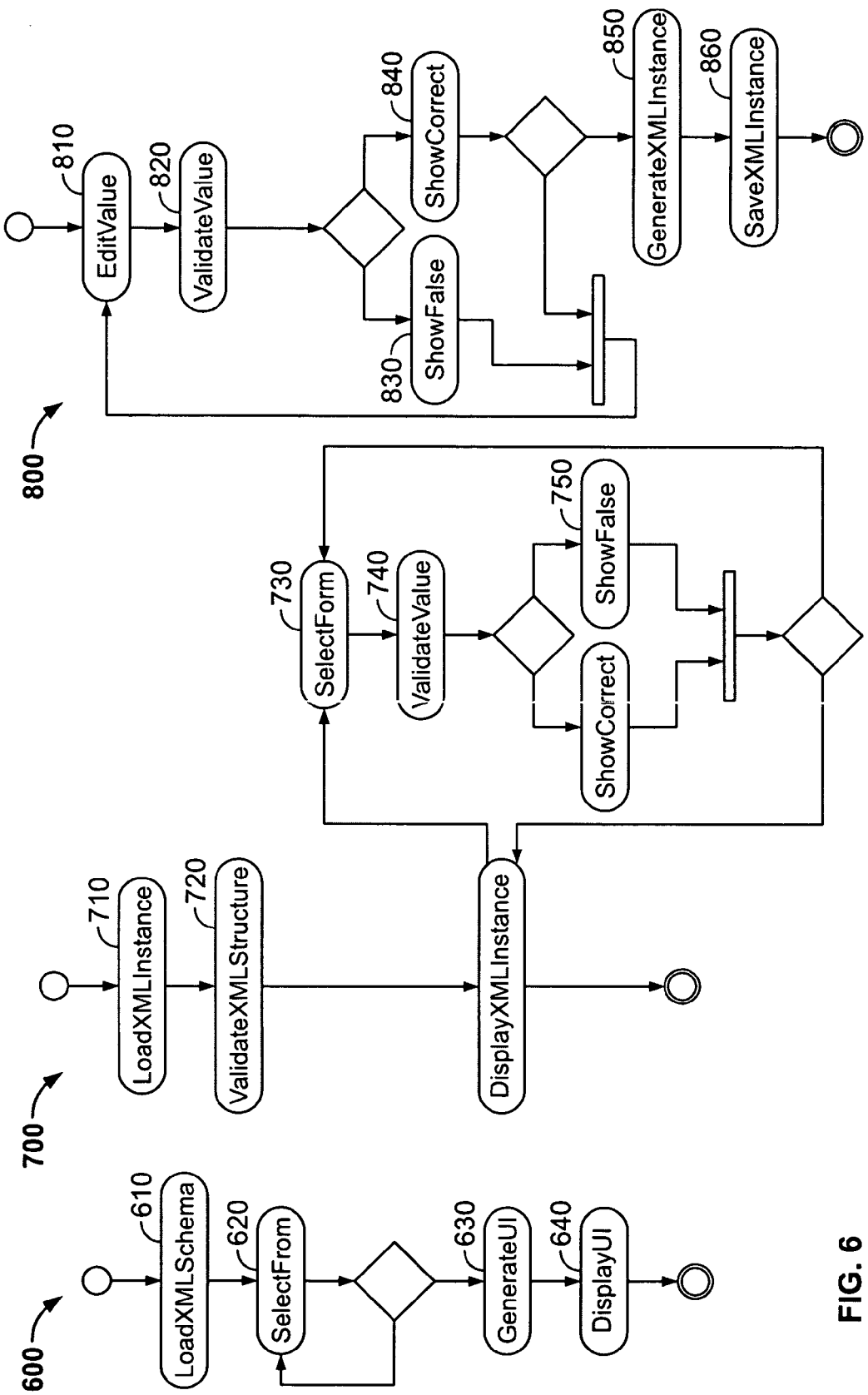
FIGS. 6-8 show embodiments of methods relating to layout information for a data component.

FIGS. 6-8 show examples of methods that can be performed in the handling of data components and their associated layout information. These and other methods can be performed by a computer that executes instructions embodied in a computer-readable medium.

In FIG. 6 and method 600, the browser loads and validates a CCTS based XML schema with embedded layout information in step 610. The layout information may be described using (X)HTML and XFORMS. In iterative step 620, the browser selects the layout information from each XSD artifact. In step 630 the browser renders the UI layout according to the layout information of (X)HTML and XFORMS constructs and controls in the assembled XSD artifacts. After the rendering is complete, the result is shown on a UI in step 640.

The browser also can show the results of an incoming CCTS-based XML instance on the UI. In FIG. 7 and method 700, the browser loads the XML instance in step 710, and validates the same against the CCTS-based XML schema in step 720. The browser takes each element node of the XML instance and puts it on the appropriate layout field of the GUI, and selects the appropriate XForms controls and binds the element equivalent element values to the XForms controls for representation by the GUI. This may involve selecting, in step 730, the XForms and HTML information of the specific data component for the relevant element in the instance. In step 740, the browser validates the element value of the instance against characteristics of each qualified or unqualified data type. Based on the validation, the browser either displays the value as correct or incorrect in the specific part of the formular, according to the relevant XForms information. For example, an incorrect value may be highlighted in red in step 750.

After a user completes one or more entries in the UI, the browser can generate a CCTS-based XML instance based on the user input. In FIG. 8 and method 800, a user makes an edit in step 810. The browser performs an online validation of the value(s) while the value is entered into specific XForms controls. If the entered value is not correct, the XForms control will be shown in an highlighted (red) color in step 830. Step 840 is performed if the entered value is correct (meaning that it is based on the definition of the data type). If all values are correctly entered into the UI, the browser generates a CCTS-based XML instance in step 850 and saves the same in step 860.

Figure 9:
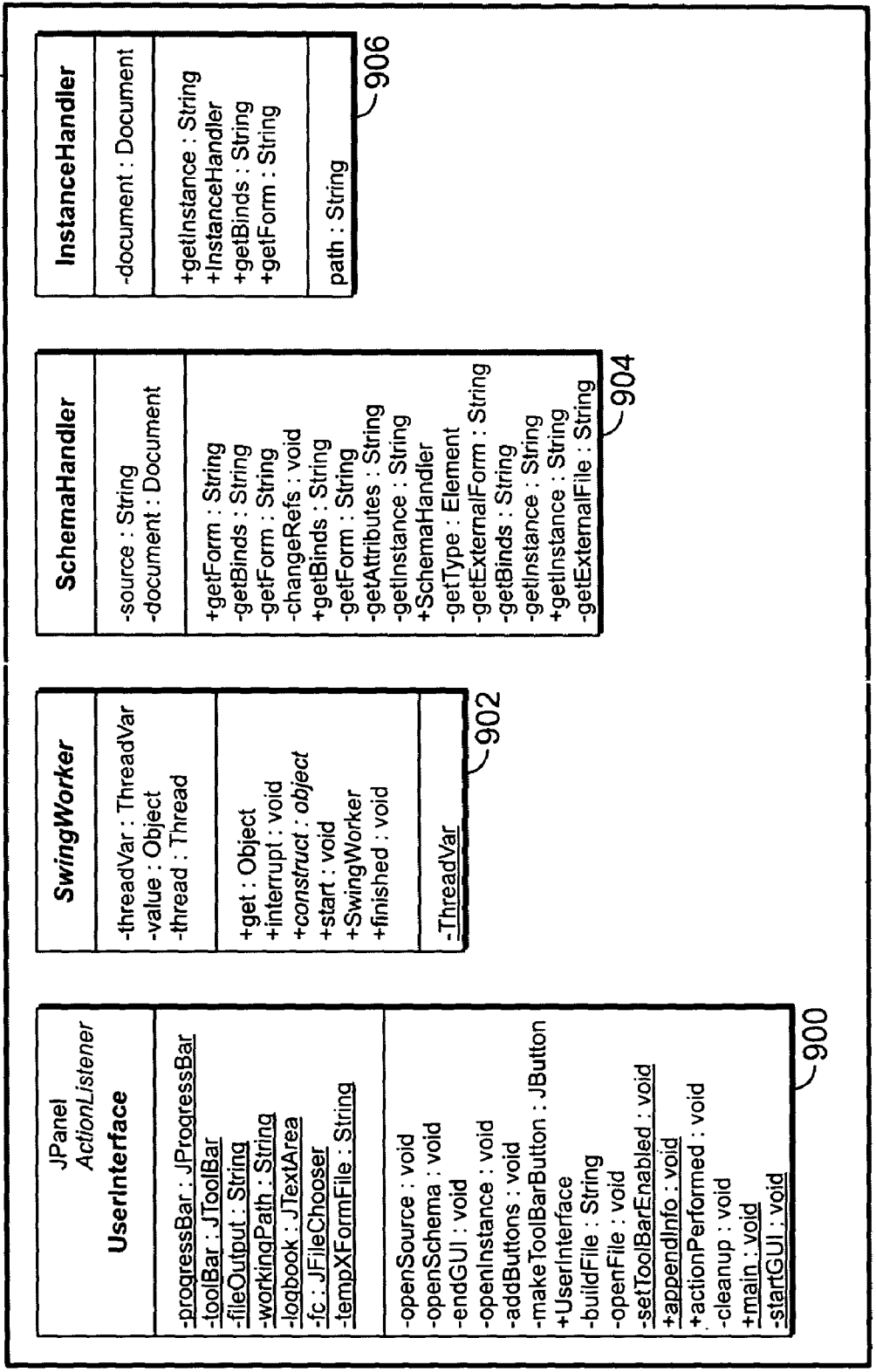
FIG. 9 schematically illustrates a data component browser.

The browser 208 is embodied in software that can be executed by the computer 110. Particularly, the browser may perform its function(s) using one or more classes, such as those schematically shown in FIG. 9. Here, a UserInterface class 900 is a GUI based on Swing, a set of program components for Java programmers. This class offers the user methods to generate forms from XML schema documents or XML instance documents. The class also visualizes the process of parsing the documents by printing textual information. When a form is generated it is possible to display its source or to start the browser.

SwingWorker class 902 is a ready-to-use class that can be implemented to keep the application usable while parsing big documents, which can be very computing intensive. This class is available from Sun Microsystems.

A SchemaHandler class 904 offers the core methods to parse an XML schema document. To generate all necessary information (form, instance, binding), the XSD is loaded into an internal representation. The class contains several public methods, for example getter methods that perform operations on the internal document and return the desired information as a string.

In particular, the schema handler class may include a getForm( ) method that gets the form information as a string representation from the document. This may involve searching a root element. Once it is found, an overloaded getForm( ) may be called with the element as parameter, which methods searches for more elements recursive within the given element from the parameter. To locate the type definition within the XML schema using XPath, a helper method called getType( ) is used which returns the element from the document which represents the type definition to the fitting <element> element. Therein the layout information is stored. This tag provides all necessary information for building the form. Every element in the appinfo contains references to types or other elements, which must be resolved. For that, changeRef( ) may be performed on every element that getForm( ) locates.

Methods getExternalFile( ) and getExternalForm( ) are used to resolve external references which are currently needed to generate select controls from external code lists (e.g. country codes or currency codes). getExternalFile( ) resolves the namespace to a filename. This file is opened in a new schema handler instance. Needed form information is fetched with getExternalForm( ).

A changeRef( ) method tries to resolve the given reference into a valid XPath expression. If any content is found behind that XPath pointer it is added to the element that contained the reference or the element is completely replaced by the new content. In addition, the reference is changed so that it will point to the form instance which is needed later to generate a fully working XForm.

A getInstance( ) method does nearly the same as getForm( ). The <element> elements in the XML schema document are parsed recursive. Each time the parsing identifies a tag named by the element, its name is generated. Furthermore, a getAttributes( ) method looks up all attributes that are defined in the type definition of an element.

A getBinds( ) method follows the principle of "walking" trough all <element> elements. It looks up the restriction in a type definition and generates an XForm binding from that.

An InstanceHandler class 906 loads an XML instance document into its internal representation. After that it searches for an attribute called "xsi:schemaLocation" which should be an attribute of the root element of the instance. It fetches the filename specified in there and takes a look at the instance directory if the schema is stored there. If this attribute is not found, the class tries to locate a file which is named like the root element. For example. with a root element like <test> it would search for test.xsd. However, if the root element equals <test xsi:schemaLocation="http://www.example.com example.xsd">, it will search for example.xsd.

Figure 10:
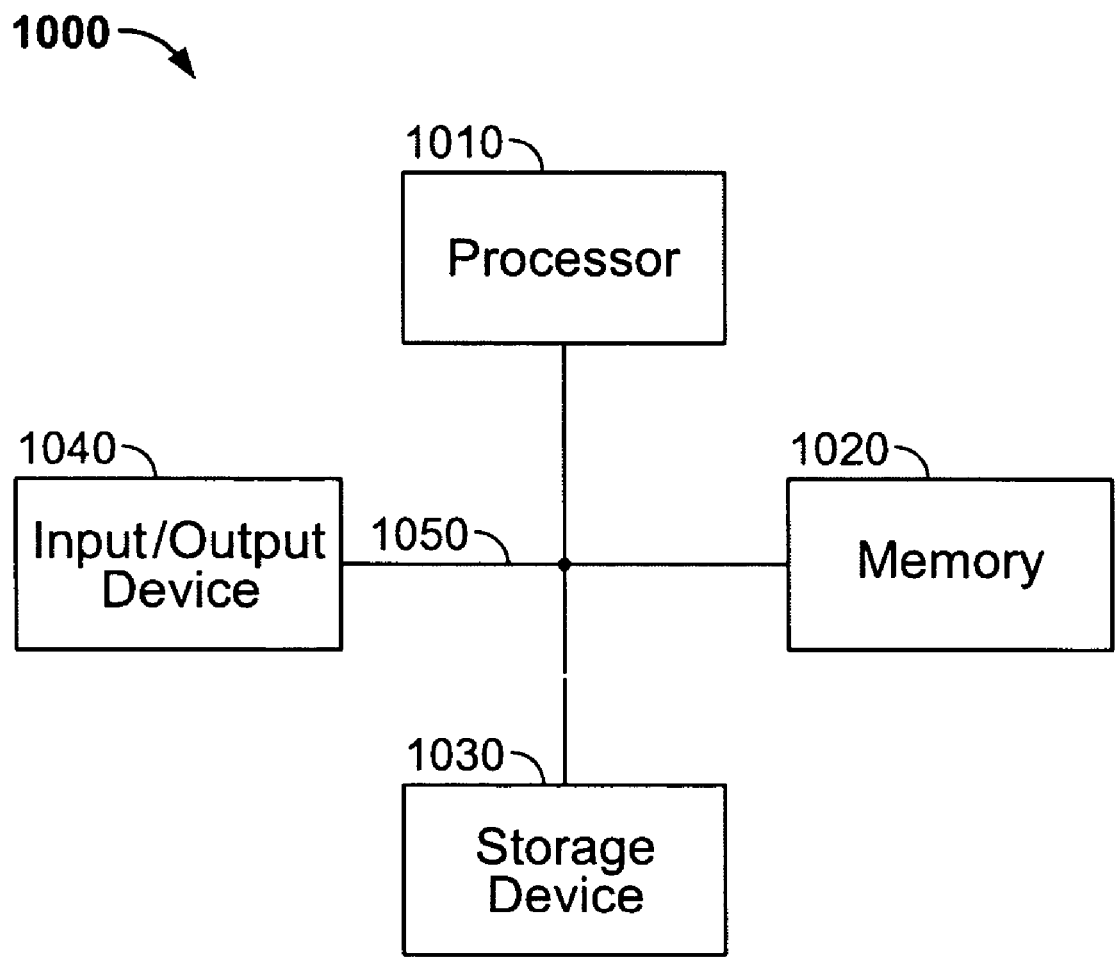
FIG. 10 is a block diagram of a general computer system.

FIG. 10 is a block diagram of a computer system 1000 that can be used in the operations described above, for example in any or all of the participants of the system 100. The system 1000 includes a processor 1010, a memory 1020, a storage device 1030 and an input/output device 1040. Each of the components 1010, 1020, 1030 and 1040 are interconnected using a system bus 1050. The processor 1010 is capable of processing instructions for execution within the system 1000. In one embodiment, the processor 1010 is a single-threaded processor. In another embodiment, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one embodiment, the memory 1020 is a computer-readable medium. In one embodiment, the memory 1020 is a volatile memory unit. In another embodiment, the memory 1020 is a non-volatile memory unit.

The storage device 1030 is capable of providing mass storage for the system 1000. In one embodiment, the storage device 1030 is a computer-readable medium. In various different embodiments, the storage device 1030 may be a floppy disk device, a hard disk device, an optical disk device, or a tape device.

The input/output device 1040 provides input/output operations for the system 1000. In one embodiment, the input/output device 1040 includes a keyboard and/or pointing device. In one embodiment, the input/output device 1040 includes a display unit for displaying graphical user interfaces. For example, the input/output device can generate the GUI that displays the data component instances described herein.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of providing layout information to be used in generating a display of data in a graphical user interface by storing schema definitions in an XML Schema Definition (XSD) schema, the method comprising:

in a computer system that is configured to contain a repository of schema definitions according to UN/CEFACT Core Components Technical Specification (CCTS) for several data components, storing, within a schema definition for a data component from the repository of schema definitions for data components, layout information for the data component, each of the data components configured for defining semantics, according to CCTS, of portions of data included in an electronic communication from a sending business entity received at a receiving business entity, the electronic communication including a portion of data associated with the data component that specifies semantics of the portion of data according to CCTS, the layout information comprising XHTML, XFORMS, XSLT, or XSL-FO to define a visual appearance of the portion of data when the portion of data is presented to the receiving business entity, the visual appearance including at least one user interface element for presenting the portion of data; and outputting, for display, the portion of data with a visual appearance defined by the layout information.

2. The method of claim 1, wherein the layout information further comprises label information defining a label for the data component.

3. The method of claim 1, wherein the layout information further comprises help function information defining a help function for the data component.

4. The method of claim 1, wherein the layout information further comprises selection control information defining a selection control for the data component.

5. The method of claim 1, wherein the layout information references the schema definition for the data component.

6. The method of claim 1, wherein the layout information references other layout information stored in a schema definition for another data component.

7. The method of claim 6, wherein the schema definition for the other data component provides a code list for an instance of the data component.

8. A computer program product tangibly embodied in a computer storage readable medium, the computer program product including instructions that, when executed, cause a processor to perform operations comprising:

in a computer system that is configured to contain a repository of schema definitions in an XML Schema Definition (XSD) schema according to UN/CEFACT Core Components Technical Specification (CCTS) for several data components, storing, within a schema definition for a data component from the repository of schema definitions for data components, layout information for the data component, each of the data components configured for defining semantics, according to CCTS, of portions of data included in an electronic communication from a sending business entity received at a receiving business entity, the electronic communication including a portion of data associated with the data component that specifies semantics of the portion of data according to CCTS, the layout information comprising XHTML, XFORMS, XSLT, or XSL-FO to define a visual appearance of the portion of data when the portion of data is presented to the receiving business entity, the visual appearance including at least one user interface element for presenting the portion of data; and outputting, for display, the portion of data with a visual appearance defined by the layout information.

9. A method of providing display of data in a graphical user interface, the method comprising:

receiving, at a receiving business entity and from a sending business entity, an electronic document that includes multiple portions of data, each portion of data associated with a data component that specifies semantics of the portion of data according to UN/CEFACT Core Components Technical Specification (CCTS);

accessing a schema repository that includes schema definitions, in an XML Schema Definition (XSD) schema, for each data component, each of the schema definitions defining the semantics according to CCTS of the portion of data associated with the data component;

accessing, within the schema definition that defines the semantics of the portion of data associated with the data component, layout information for the data component, the layout information comprising XHTML, XFORMS, XSLT, or XSL-FO to define a visual appearance of the portion of data when the portion of data is displayed to the receiving business entity; and providing, using the accessed layout information, an instance of the portion of data for display in a graphical user interface, the visual appearance of the portion of data defined by the layout information accessed from within the schema definition, the visual appearance including at least one user interface element for presenting the portion of data.

10. The method of claim 9, further comprising, before accessing the layout information:

loading the schema definition including the layout information;

validating the schema definition; and generating the graphical user interface using the layout information.

11. The method of claim 10, further comprising:

loading an XML instance containing the portion of data;

validating the XML instance against the schema definition; and displaying the portion of data in the graphical user interface.

12. The method of claim 9, further comprising forming an outgoing instance based on user input made using the generated graphical user interface.

13. The method of claim 12, wherein forming the outgoing instance comprises:

receiving the user input;

validating the user input against the schema definition; and generating an XML instance containing the portion of data.

14. The method of claim 9, wherein the schema definition for the data element is stored in an electronic document that includes an open tag and an end tag for the schema definition, wherein the layout information is included between the open and end tags, and wherein a semantics definition is provided for the data element between the open and end tags.

15. A computer program product tangibly embodied in a computer readable storage medium, the computer program product including instructions that, when executed, cause a processor to perform operations comprising:

receiving, at a receiving business entity and from a sending business entity, an electronic document that includes multiple portions of data, each portion of data associated with a data component that specifies semantics of the portion of data according to UN/CEFACT Core Components Technical Specification (CCTS);

accessing a schema repository that includes schema definitions, in an XML Schema Definition (XSD) schema, for each data component, each of the schema definitions defining the semantics according to CCTS of the portion of data associated with the data component;

accessing, within the schema definition that defines the semantics of the portion of data associated with the data component, layout information for the data component, the layout information comprising XHTML, XFORMS, XSLT, or XSL-FO to define a visual appearance of the portion of data when the portion of data is displayed to the receiving business entity; and providing, using the accessed layout information, an instance of the portion of data for display in a graphical user interface, the visual appearance of the portion of data defined by the layout information accessed from within the schema definition, the visual appearance including at least one user interface element for presenting the portion of data.

16. The computer program product of claim 15, wherein the instructions, when executed, cause the operations to be performed using a user interface class, a schema handler class and an instance handler class.

17. The computer program product of claim 15, wherein accessing the layout information comprises obtaining a string representation of the layout information from the schema definition, including by resolving external references if necessary.

18. The computer program product of claim 15, wherein the portion of data is obtained from a received XML instance.

19. The computer program product of claim 18, wherein accessing the layout information comprises identifying the schema definition and converting the portion of data to a string representation.

20. The computer program product of claim 15, wherein the schema definition for the data element is stored in an electronic document that includes an open tag and an end tag for the schema definition, wherein the layout information is included between the open and end tags, and wherein a semantics definition is provided for the data element between the open and end tags.

* * * * *